ns Patent Office 3,551,458
Patented Dec. 29, 1970

3,551,458
2-[2 - (LOWER ALKYL)-AMINO - 1-HYDROXY-ETHYL]BENZOFURAN HAVING A HYDROCARBON CYCLIC MOIETY BRIDGING POSITIONS 6 AND 7
John Mervyn Osbond, Hatfield, Graham Alwyn Fothergill, Knebworth, and James Charles Wickens, St. Albans, England, assignors to Hoffmann-La Roche Inc., Nutley, N.J., a corporation of New Jersey
No Drawing. Filed Apr. 19, 1967, Ser. No. 631,867
Claims priority, application Great Britain, Apr. 29, 1966, 18,815/66
Int. Cl. A61k 27/00; C07d 5/42
U.S. Cl. 260—346.2                                      10 Claims

ABSTRACT OF THE DISCLOSURE

2-[2-(lower alkyl)-amino - 1 - hydroxy-ethyl]benzofurans bearing a trimethylene, a tetramethylene or butadien-(1,3)-ylene-(1,4) group bridging positions 6 and 7 of the benzofuran nucleus and processes for preparing the foregoing. Such benzofuran derivatives possess marked β-type adrenergic blocking properties; and, hence, are useful in the treatment of cardiac disorders such as cardiac arrhythmia and angina pectoris.

BRIEF SUMMARY OF THE INVENTION

The present invention relates to novel products for pharmaceutical purposes and to novel processes for preparing the foregoing. The novel products which are included within the purview of the present invention can be characterized broadly in a chemical sense as being benzofuran derivatives containing a cyclic moiety bridging positions 6 and 7 of the benzofuran nucleus.

DETAILED DESCRIPTION OF THE INVENTION

The novel benzofuran derivatives which are characterized broadly in a chemical sense hereinabove are of the formula

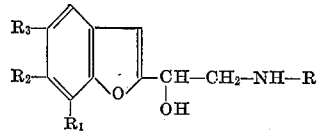

wherein R represents lower alkyl;
$R_1$ and $R_2$, taken together, are selected from the group consisting of trimethylene, tetramethylene and butadien-(1,3)-ylene-(1,4) and $R_3$ is selected from the group consisting of hydrogen, chlorine and bromine
and acid addition salts thereof with pharmaceutically acceptable acids.

The term "lower alkyl" as utilized herein is intended to designate a straight or branched chain hydrocarbon group having 1–7 carbon atoms in the chain, most preferably 1–4 carbon atoms in the chain. Representative of lower alkyl groups suitable for the purposes of the present invention are methyl, ethyl, propyl, isopropyl, butyl, tertiary butyl and the like. Preferred is a compound of the Formula I above wherein R is an isopropyl group. Also, an advantageous class of compounds included within the purview of the present invention are compounds of the Formula I above wherein $R_3$ represents bromine and acid addition salts of such compounds with pharmaceutically acceptable acids. An especially interesting class of compounds corresponding to the Formula I above are those wherein $R_3$ is hydrogen and the pharmaceutically acceptable acid addition salts thereof with pharmaceutically acceptable acids.

The novel compounds of the Formula I above can be prepared utilizing a variety of reaction routes. In one such preparative technique, a compound of the formula

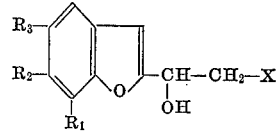

wherein $R_1$, $R_2$ and $R_3$ have the same meaning as ascribed thereto hereinabove and X is selected from the group consisting of chlorine and bromine
is reacted with an amine of the formula

     (III)

wherein R has the same meaning as above.

The compound of the Formula II above may be obtained by reducing a haloketone of the formula

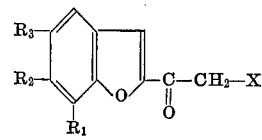

wherein $R_1$, $R_2$, $R_3$ and X have the same meaning as attributed thereto hereinabove.

In effecting the reduction of the haloketone of the Formula IV above to the corresponding compound of the Formula II above, there is utilized a reducing system which will reduce the ketone group but which will not effect the other reducible entity present in the benzofuran molecule, i.e. the 2,3-double bond. Preferred for the reducing purpose are alkali metal borohydride reducing agents, e.g. lithium borohydride, potassium borohydride, or most preferentially, sodium borohydride.

Preferably, an organic solvent such as a lower alkanol, e.g. ethanol, or aqueous dioxane is employed as the reaction medium and the halo-ketone is advantageously dissolved therein prior to the addition of the reducing agent, e.g. a borohydride. It will be apparent to those skilled in the art, however, that other solvents which are inert under the reaction conditions employed in this process step can also be efficaciously utilized as the reaction medium. Suitably, the reduction of the haloketone of the Formula IV above with a borohydride is carried out at a temperature of 20° C. or below, most advantageously, at a temperature from about 0° to about 20° C. Representative of other reducing systems usable in this reduction step is aluminum isopropoxide, preferentially provided in a solvent medium such as isopropanol. The reduction utilizing aluminum isopropoxide and isopropanol is advantageously carried out at an elevated temperature, i.e. above room temperature.

The conversion of a compound of the Formula II above into the corresponding compound of the Formula I above utilizing a compound of the Formula III above (a compound of the formula R—$NH_2$) is effected by treating a compound of the Formula II above with at least 1 mole of a compound of the Formula III above at elevated temperatures, most preferably, at a temperature of from about 50° to about 100° C., in the presence of a suitable acid acceptor. By utilizing an excess of the amine, a two-fold purpose can be served; namely, the provision of a material that can serve both as an acid acceptor and as a participant in the reaction. In a preferred aspect, the acid acceptor is provided accordingly. However, any suitable acid binding agent such as alkali metal carbonates, e.g. sodium carbonate, pyridine and the like which is capable of performing the acid accepting function is contemplated within the purview of the present invention. The conversion of a compound of the Formula II above into a corresponding compound of the Formula I above in a preferred process aspect is carried out using at least two moles of an amine of the Formula III above for each 1 mole of a compound of the Formula II above present in the reaction zone. Suitably, the reaction is carried out in an inert organic solvent such as ethanol, but an inert organic solvent is not necessary for a successful performance of the process step leading to a compound of the Formula I utilizing a corresponding compound of the Formula II as a starting material except where its presence is required to assure solution of the acid acceptor. It should be apparent to those skilled in the art that when a compound of the Formula III above is a volatile amine such as isopropylamine, the treatment of a compound of the Formula II above with such an amine should preferably take place in a closed vessel. As is evident from the above, especially preferred for the purposes of the present invention is a compound of the Formula III above wherein R is isopropyl, namely, isopropylamine.

In an alternate preparative route to compounds of the Formula I above, a compound of the Formula II above is dehydrohalogenated to the corresponding epoxide of the formula

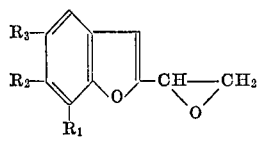

IV wherein $R_1$, $R_2$ and $R_3$ are as above.

The resulting compound of the Formula IV above is reacted with an amine of the Formula III above whereby to yield the corresponding compound of the Formula I above.

The dehydrohalogenation of a compound of the Formula II above to the corresponding epoxide of the Formula IV above proceeds preferably at room temperature in the presence of a suitable base such as an alkail metal hydroxide, e.g. potassium hydroxide, in solution in a suitable solubilizing medium, preferably, a lower alkanol, most suitably, methanol. Alternatively, the dehydrohalogenation can proceed with equal efficacy by treating a compound of the Formula II above suspended in a non-polar organic solvent such as an aromatic hydrocarbon, e.g. benzene and the like with an alkali metal hydroxide, e.g. potassium hydroxide.

The conversion of the epoxide of the Formula IV above to the corresponding compound of the Formula I above via the reaction thereof with an amine of the Formula III above can be carried out by heating the two at an elevated temperature, most preferentially at a temperature from about 50° to about 100° C. It is preferred to use an excess of the amine in this process step whereby the amine can serve the two-fold purpose of being a reaction partner and the reaction medium. Alternatively, the reaction can be conducted in an inert organic solvent such as benzene, at room temperature in the presence of an aprotic Lewis acid, for example, boron trifluoride and the like. Most suitably, there is added to the reaction zone when effecting the alternative process aspect, boron trifluoride in the form of its etherate, i.e. boron trifluoride etherate.

The compound of the Formula II above can be obtained by converting an aldehyde of the formula

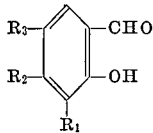

V wherein $R_1$, $R_2$ and $R_3$ are as above into an alkali metal salt thereof by treating same with a suitable base, e.g. potassium hydroxide and the like, in the presence of a lower alkanol, e.g. ethanol. The alkali metal hydroxide is conveniently provided to the reaction zone in solution with a lower alkanol, e.g. adding ethanolic potassium hydroxide to the reaction zone. The so-formed alkali metal salt is then treated with chloroacetone.

The resulting product is chlorinated or brominated whereby to prepare the corresponding compound of the Formula II above.

The last-mentioned bromination or chlorination is conveniently effected by treating the product resulting after treatment with chloroacetone as described above with any suitable chlorinating or brominating agent. For example, by treating the product formed as a result of the chloroacetone treatment with sulfuryl chloride, compounds of the Formula II above wherein X is chlorine can be obtained. By brominating with, for example, bromine in an inert organic solvent such as ether, or with cupric bromide in a mixture of ethyl acetate and chloroform or with trimethyl phenyl ammonium perbromide in tetrahydrofuran, a compound of the Formula II above wherein X is bromine can be obtained.

As is described above, the product obtained by reacting a compound of the Formula II above or an epoxide of the Formula IV above with an amine of the Formula III above is a substituted 2-[2-(lower alkyl) amino-1-hydroxy-ethyl]-benzofuran of the Formula I above. When proceeding along the reaction path described above, there may also be obtained, the corresponding 2-[1-(lower alkyl) amino-2-hydroxy-ethyl]-benzofuran as a by-product. The resulting by-product can be separated from the desired end product of the Formula I above by conventional methods well documented in the literature. For example, chromatography on alumina or fractional crystallization of the bases or the acid addition salts they form on treatment with pharmaceutically acceptable acids will result in separation of the by-product.

Compounds of the Formula I above wherein $R_3$ represents hydrogen can be further prepared from the corresponding compounds of the Formula I above wherein $R_3$ represents halogen by catalytically hydrogenating the last-mentioned compound.

For example, the catalytic hydrogenation of the compounds of the Formula I above wherein $R_3$ is halogen to the corresponding compounds of the Formula I above wherein $R_3$ is hydrogen is preferably effected in the presence of a palladium catalyst, e.g. palladium on carbon at room temperature and atmospheric pressure. The catalytic hydrogenation may also be carried out conveniently in an alkaline medium, e.g. an alkali metal hydroxide, such as potassium hydroxide, disposed in a lower alkanol, e.g. methanol, at atmospheric pressure and room temperature. When proceeding thusly, the removal of the $R_3$ chlorine atom or the $R_3$ bromine atom from a compound of the Formula I above proceeds quite facilely and a noticeable drop in hydrogen absorption is readily ascertainable when such removal is substantially completed. In fact, once the removal of such chlorine or bromine atoms is substantially complete, the reaction almost comes to a standstill.

It will be recognized by those skilled in the art that the compounds of the Formula I above contain an asymmetrical carbon atom and hence, occur in the form of stereoisomeric racemates. It will be further appreciated that the foregoing racemates can, if desired, be separated into their optical isomers according to well-known procedures for effecting this end. For example, fractional recrystallization of the salts can be utilized to separate said racemates into their optically active isomers.

As is evident from the foregoing, the compounds of the Formula I above form acid addition salts with pharmaceutically acceptable acids. For example, they form salts with inorganic acids such as hydrochloric acid, hydrobromic acid, sulphuric acid and phosphoric acid. They also form salts with organic acids, for example, acetic acid, tartaric acid, maleic acid, citric acid and p-toluenesulfonic acid.

The benzofuran derivatives of the Formula I above possess marked β-type adrenergic blocking properties. Thus, they are useful in the treatment of cardiac disorders such as cardiac arrhythmia and angina pectoris. The novel pharmaceutically valuable agents provided by the present invention can be administered to a warm blooded animal host in pharmaceutical dosage forms with dosage adjusted to fit the exigencies of the pharmacological situation. In administering a compound of the Formula I above to a warm blooded animal host, there is utilized from about 0.1 mg. to about 100 mg. thereof per kilogram of body weight of the said animal host, preferably from about 0.1 mg. to about 30 mg. thereof per kilogram of body weight of the said animal host and most preferably from about 0.2 mg. to about 10 mg. thereof per kilogram of body weight of the said animal host.

The pharmacological preparations can be compounded for enteral, e.g. oral, or parenteral administration according to a conventional practice. Thus, dosage forms may be prepared by incorporating the active ingredient in a tablet, pill, power, capsule or granular dosage formulation. The carrier may be inorganic, such as talc, or organic such as lactose or starch. Additives such as magnesium stearate, as a lubricant, may also be present in the pharmacological dosage form. Liquid preparations for oral administrations include emulsions, solutions and suspensions. Conventional diluents usable for forming same include water and petroleum jelly. The liquid preparations may take the form of sterile aqueous or non-aqueous solutions, suspensions or emulsions. As suspending agents, vegetable oils and polyoxyethyleneglycols may be utilized. Emulsifying agents, dispersing agents and other pharmaceutically adjuvants may also be incorporated if necessary in the dosage form. The so-obtained preparation can be sterilized according to conventional procedures and also may include other therapeutically valuable material.

The following examples are illustrative but not limitative of the present invention. All temperatures are stated in degrees centigrade.

Example 1

13 g. of 5-bromo-2-(2 - chloro - 1 - hydroxy - ethyl)-6,7,8,9-tetrahydro - naphtho[1,2 - b]furan are heated under reflux for 24 hours with 14.4 g. (0.24 mol) of isopropyl amine and 100 ml. of ethanol. The ethanol and the excess isopropyl amine are then evaporated off and the residue is partitioned between ether and sodium hydroxide solution. The ether layer is separated, washed with water and with brine and dried over anhydrous sodium sulfate. The dried solution is filtered and evaporated to dryness. The crystalline residue remaining is recrystallized from petroleum ether (boiling range=60°–80°) yielding 5-bromo -2 - (2 - isopropylamino - 1 - hydroxy-ethyl)-6,7,8,9-tetrahydro-naphtho - [1,2-b] furan in the form of a buff crystalline powder of melting point 122°–123°. A solution of the free base in ethanol is treated with ethereal hydrofien chloride to give the corresponding hydrochloride in the form of buff crystals of melting point 176°–178° after recrystallization from ethanol.

The starting material used in the above process may be obtained as folows:

A solution of 8.4 g. of potassium hydroxide in 60 ml. of ethanol is added dropwise with stirring at room temperature to a solution of 34.4 g. (0.135 mol) of 4-bromo-2-formyl - 1 - hydroxy - 5,6,7,8 - tetrahydro - naphthalene in 200 ml. of ethanol. 18.75 g. (0.2 mol) of chloro-acetone are added dropwise with stirring over a period of 15 minutes to the suspension of the yellow potassium salt obtained. The mixture is stirred at room temperature for 24 hours, then diluted with about 1000 ml. of water and extracted three times with chloroform. The combined chloroform extracts are washed successively with water, dilute sodium hydroxide solution, water and brine and dried over anhydrous sodium sulfate. The dried solution is filtered and evaporated under reduced pressure. The solid residue remaining is crystallized from ethanol giving 2 - acetyl - 5 - bromo - 6,7,8,9 - tetrahydronaphthol[1,2 - b]furan in the form of yellow prisms of melting point 139°–140°.

5 ml. (8.17 g., 0.0525 mol) of sulfuryl chloride are added dropwise with stirring over a period of 10 minutes to a solution of 14.7 g. (0.05 mol) of 2-acetyl - 5 - bromo - 6,7,8,9 - tetrahydro - naphtho[1,2-b]furan in 60 ml. of chloroform. The mixture is warmed slowly to reflux, then heated at gentle reflux with stirring for 3 hours. The resulting mixture is then cooled and poured into ice-water. The organic layer and the aqueous layer are separated and the aqueous layer is extracted with chloroform. The organic layer and the chloroform extract are combined, washed with dilute sodium carbonate solution and water and dried over anhydrous sodium sulfate. The dried solution is filtered and evaporated to dryness under reduced pressure. The solid residue so obtained is crystallized from 500 ml. of ethanol to give 2 - chloroacetyl - 5 - bromo - 6,7,8,9 - tetrahydro - naphtho[1,2-b] furan as fine buff-colored needles of melting point 150°–152°.

0.95 g. (0.025 mol) of sodium borohydride are added portionwise at 0° over a period of 20 minutes to a solution of 13.0 g. (0.04 mol) of 2-chloroacetyl - 5 - bromo-6,7,8,9 - tetrahydro-naphtho[1,2-b]furan in a mixture of 80 ml. of dioxane and 20 ml. of water. The mixture is stirred at room temperature for 3 hours and then diluted with water. The dioxane is removed by evaporation under reduced pressure at 40° and the residue is extracted three times with ether. The combined ether extracts are washed with water and with brine and dried over anhydrous sodium sulfate. The dried solution is filtered and evaporated under reduced pressure yielding 5-bromo - 2 - (2 - chloro - 1 - hydroxyethyl) - 6,7,8,9 - tetrahydronaphtho[1,2-b]furan in the form of a yellow oil.

Example 2

A mixture of 1.0 g. of 5 - bromo - 2 - epoxyethyl-6,7,8,9 - tetrahydro - naphtho[1,2-b]furan and 1.2 g. of isopropyl amine in 50 ml. of methanol/benzene (1:1) is heated at 100° in a sealed autoclave for 48 hours. The resulting solution is cooled and evaporated to dryness. The residue is then partitioned between ether and 0.5 N hydrochloric acid. The aqueous layer is separated, washed with ether, made alkaline with dilute sodium hydroxide solution and extracted with ether. The ether extracts are washed with water, dried over sodium sulfate and evaporated. The resulting buff-colored solid is recrystallized from petroleum ether (boiling range=60°–80°) to give 5 - bromo - 2 - (2 - isopropylamino - 1 - hydroxy - ethyl)-6,7,8,9 - tetrahydro - naphtho[1,2-b]furan in the form of buff crystals of melting point 118°–120° and identical with that obtained in accordance with Example 1. A solution of the free base in ethanol is treated with ethereal hydrogen chloride to give the corresponding hydrochloride of melting point 177°–178°, identical with the hydrochloride obtained in accordance with Example 1.

The starting material used in the above process may be obtained as follows:

A solution of 6.5 g. of 5 - bromo - 2 - (2 - chloro - 1-hydroxyethyl) - 6,7,8,9 - tetrahydro - naphtho[1,2-b] furan in 50 ml. of dry benzene is added at room temperature over a period of 30 minutes to a well-stirred suspension of 4 g. of powdered potassium hydroxide in 40 ml. of dry benzene. The resulting mixture is stirred at room temperature for 2 hours, then filtered. The filtrate is washed with water until the washings are no longer alkaline, dried over sodium sulfate and evaporated. The pale yellow crystalline residue is recrystallized from ethanol to give 5 - bromo - 2 - epoxyethyl - 6,7,8,9 - tetrahydro - naphtho[1,2-b]furan in the form of pale yellow plates of melting point 116°–117°.

Example 3

3.52 g. (0.01 mol) of 5-bromo-2-(2-isopropylamino-1-hydroxy-ethyl) - 6,7,8,9 - tetrahydro - naphtho[1,2-b]furan (obtained as in Example 1) in 50 ml. of ethanol are hydrogenated in the presence of 5% palladium-on-charcoal. After 35 minutes, one molar equivalent of hydrogen is absorbed and thereafter the rate of absorption of hydrogen becomes negligible. The hydrogenation is terminated, the catalyst is filtered off and the filtrate is diluted with 200 ml. of water and made basic with dilute sodium hydroxide solution. The alkaline solution is extracted twice with ether and the combined extracts are washed with water and with brine and dried over sodium sulfate. The dried solution is filtered and evaporated to dryness. The residual oil is taken up in ethanol and treated with ethereal hydrogen chloride. The crystalline 2-(2-isopropylamino-1-hydroxy-ethyl) - 6,7,8,9 - tetrahydro - naphtho[1,2-b]furan hydrochloride thus formed is recrystallized from ethanol/ether to give white microcrystals of melting point 155–156°.

Example 4

5 - bromo - 2 - (2 - chloro - 1 - hydroxy - ethyl) - 7,8-dihydro-6H-indeno[4,5-b]furan is reacted with isopropyl amine in ethanol as described in Example 1. The resulting product, 5 - bromo - 2 - (2 - isopropylamino - 1 - hydroxy-ethyl)-7,8-dihydro-6H-indeno[4,5-b]-furan, is isolated as its free base which melts at 134°–135° when crystallized from petroleum ether (boiling range=60°–80°). The corresponding hydrochloride melts at 182°–183° (from ethanol/ether).

The starting material of the above process may be obtained as follows:

7 - bromo - 5 - formyl - 4 - hydroxy - indane is converted, via its potassium salt, into 2-acetyl-5-bromo-7,8-dihydro-6H-indeno[4,5-b]furan as described in Example 1, which upon crystallization from ethanol gives pale yellow crystals of melting point 153°–155°.

Treatment of 2-acetyl-5-bromo-7,8-dihydro-6H-indeno[4,5-b]furan with sulphuryl chloride as described in Example 1 gives 2-chloroacetyl-5-bromo-7,8-dihydro-6H-indeno[4,5-b]furan as pale brown needles of melting point 140°–143° (from ethanol).

2 - chloroacetyl - 5 - bromo - 7,8 - dihydro - 6H - indeno[4,5-b]furan is reduced in aqueous dioxane with sodium borohydride as described in Example 1 to give 5-bromo-2-(2-chloro-1-hydroxyethyl)-7,8-dihydro - 6H - indeno[4,5-b]furan. The so-obtained product may be used in its crude state in the preparative procedure described in the first paragraph of this example.

Example 5

5 - bromo - 5 - (2 - isopropylamino - 1 - hydroxyethyl)-7,8-dihydro-6H-indeno[4,5-b]furan is debrominated by hydrogenation in the presence of palladium-on-charcoal as described in Example 3. 2-(2-isopropylamino-1-hydroxy-ethyl)-7,8-dihydro-6H-[4,5-b]furan is isolated as its free base which melts at 90°–91° after crystallization from petroleum ether (boiling range=60°–80°). The corresponding hydrochloride is obtained in the form of off-white crystals of melting point 195° (from ethanol/ether).

Example 6

12 g. of 2 - (2 - bromo - 1 - hydroxy - ethyl) - naphtho[1,2-b]furan are heated under reflux for 24 hours with 18.0 g. (0.3 mol) of isopropyl amine and 50 ml. of ethanol. The ethanol and excess isopropyl amine are then evaporated off under reduced pressure leaving a gum. The residual gum is made basic with dilute sodium hydroxide solution and extracted twice with ether. The combined ether extracts are washed with water and dried over anhydrous sodium sulfate. The dried solution is filtered and evaporated leaving a yellow oil. The residual yellow oil is dissolved in methanol and to the resulting solution is added a methanolic solution of oxalic acid. The oxalate which precipitates as an off-white powder is shown by thin layer chromatography to contain two components which are readily separable by means of fractional crystallization from ethanol.

One component has a melting point of 127°–130°. This is converted into a free base which is 2-(2-isopropylamino-1-hydroxy-ethyl)naphtho[1,2-b]furan. The free base is dissolved in ethanol, ethereal hydrogen chloride is added and 2 - (2 - isopropylamino - 1 - hydroxy - ethyl) - naphtho[1,2-b]furan hydrochloride are obtained as off-white prisms of melting point 147°–148° (from ethanol/ether).

The second component of the oxalate aforesaid has a melting point 203°–204°. This too is converted into a free base which is 2 - (1 - isopropylamino - 2 - hydroxy - ethyl)-naphtho[1,2-b]furan. This base is dissolved in ethanol, ethereal hydrogen chloride is added and 2-(1-isopropylamino - 2 - hydroxyethyl) - naphtho[1,2-b]furan hydrochloride is obtained as white crystals melting at 174°–175° (from ethanol/ether).

The starting material used in the above process may be obtained as follows:

A solution of 12.0 g. of potassium hydroxide in 120 ml. of ethanol is carefully added with stirring at room temperature to a solution of 26.7 g. (0.155 mol) of 2-formyl-1-hydroxy-naphthalene in 200 ml. of ethanol. 12.0 ml. (16.2 g., 0.17 mol) of chloroacetone are added dropwise over a period of 15 minutes to the stirred suspension of the resulting potassium salt. The mixture obtained is stirred at room temperature for 24 hours, then 1000 ml. of water are added and the mixture is extracted three times with chloroform. The combined extracts are washed successively with water, dilute sodium hydroxide solution, water and brine and dried over anhydrous sodium sulfate. The dried solution is filtered and evaporated to dryness under reduced pressure. The residual viscous oil is distilled under reduced pressure and the fraction boiling at 150°–170°/0.5 mm. Hg is crystallized from ethanol to give a 2-acetyl-naphtho[1,2-b]furan in the form of off-white needles of melting point 75°–75.5°.

23.5 g. (0.0625 mol) of trimethyl phenyl ammonium perbromide are added in a single portion at room temperature to a stirred solution of 13.1 g. (0.0625 mol) of 2-acetylnaphtho[1,2-b]furan in 130 ml. of dry tetrahydrofuran; after a few minutes, a precipitate of trimethyl phenyl ammonium bromide begins to appear. Stirring is continued for 30 minutes, then the mixture is poured into ice-water and extracted twice with ether. The combined ether extracts are washed with sodium bicarbonate solution, with water and with brine and dried over anhydrous sodium sulfate. The dried solution is filtered and evaporated to dryness. The residual crystalline solid is recrystallized from ethanol to give 2-bromoacetyl-naphtho-[1,2-b]furan in the form of pale brown needles of melting point 125°–127°.

1.2 g. (0.03 mol) of sodium borohydride are added portionwise with stirring at 0° over a period of 30 minutes to a solution of 12.0 g. (0.0415 mol) of 2-bromoacetyl-naphthol[1,2-b]furan in a mixture of 120 ml. of dioxane and 30 ml. of water. The mixture obtained is stirred at room temperature for 2 hours. 200 ml. of water are then added and the dioxan is removed by evaporation under reduced pressure at 40°. The residue is extracted twice with ether and the combined extracts are washed with water and with brine and dried over anhydrous sodium sulfate. The dried solution is filtered and evaporated under reduced pressure to give 2-(2-bromo-1-hydroxyethyl)-naphtho[1,2-b]furan in the form of a dark yellow viscous oil.

Example 7

Tablets each containing 50.0 mg. of 2-(2-isopropylamino - 1 - hydroxy - ethyl)-6,7,8,9 - tetrahydro - naphtho-[1,2-b]furan hydrochloride, 86 mg. of lactose, 50.0 mg. of corn starch, 8.0 mg. of pregelatinized corn starch and 3.0 mg. of calcium stearate and each having total weight of 200.0 mg. are prepared by mixing the active material, lactose, corn starch and pregelatinized corn starch in a suitable mixer, passing the mix through a comminuting machine having a screen with knives forward, returning the comminuted mix to the mixer, moistening it with water so as to form a thick paste, passing the moist mass through a suitable screen, drying the granules obtained on paper-lined trays at 44°, returning the dried granules to the mixer, adding the calcium stearate, mixing well and pressing the granulate at a tablet weight of 200.0 mg. using standard techniques; the tablets may be scored is desired.

Example 8

Capsules each containing 25.0 mg. of 2-(2-isopropyl-amino-1-hydroxy-ethyl)-6,7,8,9 - tetrahydro-naphtho[1,2-b]furan hydrochloride, 160 mg. of lactose, 30.0 mg. of corn starch and 5.0 mg. of talc and each having a total net weight of 220.0 mg. are prepared by mixing the active material, lactose and corn starch in a suitable mixer, passing the mix through a comminuting machine, returning the comminuted mix to the mixer, adding the talc, thoroughly blending the resulting mixture and filling it into hard shell gelatin capsules.

We claim:

1. A compound selected from the group consisting of compounds of the formula

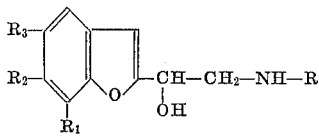

wherein

R represents lower alkyl, $R_1$ and $R_2$, taken together, are selected from the group consisting of trimethylene, tetramethylene, or butadien-(1,3)-ylene-(1,4) and $R_3$ is selected from the group consisting of hydrogen, chlorine and bromine and acid addition salts thereof with pharmaceutically acceptable acids.

2. A compound as defined in claim 1 wherein $R_3$ is bromine.

3. A compound as defined in claim 1 wherein $R_3$ is hydrogen.

4. A compound as defined in claim 1 wherein R is isopropyl.

5. A compound as defined in claim 4 wherein $R_3$ is hydrogen.

6. A compound as defined in claim 1 of the formula 5 - bromo - 2-(2-isopropylamino-1-hydroxy-ethyl)-6,7,8,9-tetrahydro-naphtho[1,2-b]furan and acid addition salts thereof with pharmaceutically acceptable acids.

7. A compound as defined in claim 1 of the formula 2-(2-isopropylamino-1-hydroxy-ethyl) - 6,7,8,9 - tetrahydro-naptho[1,2-b]furan and acid addition salts thereof with pharmaceutically acceptable acids.

8. A compound as defined in claim 1 of the formula 5-bromo-2-(2-isopropylamino - 1 - hydroxy-ethyl)-7,8-dihydro-6H-indeno[4,5-b]furan and acid addition salts thereof with pharamaceutically acceptable acids.

9. A compound as defined in claim 1 of the formula 2-(2-isopropylamino-1-hydroxy-ethyl)-7,8 - dihydro - 6H-indeno[4,5-b]furan and acid addition salts thereof with pharmaceutically acceptable acids.

10. A compound as defined in claim 1 of the formula 2-(2-isopropylamino-1-hydroxy-ethyl)-naptho[1,2 - b]-furan and acid addition salts thereof with pharmaceutically acceptable acids.

References Cited

UNITED STATES PATENTS 3,226,402   12/1965   Schoetensack et al. __ 260—346.2

OTHER REFERENCES

Patterson, A.—The Ring Index; McGregor & Werner Inc. (1960) p. 324.

ALEX MAZEL, Primary Examiner

B. I. DENTZ, Assistant Examiner

U.S. Cl. X.R.

424—285